(12) United States Patent
Coward

(10) Patent No.: US 10,035,219 B2
(45) Date of Patent: Jul. 31, 2018

(54) ELECTROSTATIC POWDER FEEDER

(71) Applicant: Product Innovation and Engineering L.L.C., Rolla, MO (US)

(72) Inventor: Connor Coward, O'Fallon, MO (US)

(73) Assignee: Product Innovation and Engineering L.L.C., Rolla, MO (US)

( * ) Notice: Subject to any disclaimer, the term of this patent is extended or adjusted under 35 U.S.C. 154(b) by 178 days.

(21) Appl. No.: 14/994,973

(22) Filed: Jan. 13, 2016

(65) Prior Publication Data

US 2017/0198394 A1  Jul. 13, 2017

(51) Int. Cl.

| | |
|---|---|
| *A45D 24/22* | (2006.01) |
| *B65D 83/00* | (2006.01) |
| *B65D 88/66* | (2006.01) |
| *B23K 26/144* | (2014.01) |
| *B23K 26/342* | (2014.01) |
| *C23C 24/10* | (2006.01) |
| *B23K 26/14* | (2014.01) |
| *B05B 5/03* | (2006.01) |
| *B33Y 40/00* | (2015.01) |

(52) U.S. Cl.
CPC ............ *B23K 26/144* (2015.10); *B05B 5/032* (2013.01); *B23K 26/147* (2013.01); *B23K 26/342* (2015.10); *C23C 24/10* (2013.01); *B33Y 40/00* (2014.12)

(58) Field of Classification Search
CPC .. B23K 26/144; B23K 26/342; B23K 26/147; B05B 5/032; C23C 24/10; B33Y 40/00; B03C 7/00; B03C 7/02; B03C 7/12
USPC .................................................... 222/196, 71
See application file for complete search history.

(56) References Cited

U.S. PATENT DOCUMENTS

| 827,770 | A | * | 8/1906 | Woodsome | ............... | B03C 7/12 |
| | | | | | | 209/130 |
| 960,470 | A | * | 6/1910 | Wentworth | ............... | B03C 7/12 |
| | | | | | | 209/130 |
| 2,180,804 | A | * | 11/1939 | Fahrenwald | ............. | B03C 7/00 |
| | | | | | | 209/127.2 |
| 2,197,864 | A | * | 4/1940 | Johnson | .................... | B03C 7/00 |
| | | | | | | 106/746 |

(Continued)

OTHER PUBLICATIONS

Office Action dated Aug. 12, 2016 cited in co-pending U.S. Appl. No. 14/558,306.

*Primary Examiner* — Benjamin R Shaw
(74) *Attorney, Agent, or Firm* — Don V. Kelly; Evans & Dixon, L.L.C.

(57) ABSTRACT

An apparatus for feeding powder particles includes a hopper holding a supply of powder. A voltage supply is in electrical communication with a first electrode and a second electrode. The hopper is configured to drop powder onto the first electrode. The voltage supply is capable of producing an electric potential between the first electrode and second electrode and causing the powder particles landing on the first electrode to develop a surface charge. The second electrode is positioned remotely from the first electrode such that the electric field between the first electrode and the second electrode causes the powder particles that fall onto the first electrode to move off the first electrode and move toward the second electrode. The powder particles moving toward the second electrode may or may not reach the electrode, but in either case drop away from the second electrode due to the force of gravity.

2 Claims, 18 Drawing Sheets

(56) References Cited

U.S. PATENT DOCUMENTS

| | | | | |
|---|---|---|---|---|
| 2,361,946 A | * | 11/1944 | Johnson | B03C 7/04 |
| | | | | 209/127.3 |
| 4,071,169 A | * | 1/1978 | Dunn | B01F 13/0001 |
| | | | | 222/71 |
| 4,172,028 A | * | 10/1979 | Dunn | B03C 7/12 |
| | | | | 209/12.2 |
| 5,484,061 A | * | 1/1996 | Dunn | B03C 7/04 |
| | | | | 209/12.2 |
| 5,551,642 A | * | 9/1996 | Dunn | B03C 7/04 |
| | | | | 241/301 |
| 5,769,276 A | * | 6/1998 | Alexander | B05B 3/02 |
| | | | | 222/148 |
| 6,122,564 A | | 9/2000 | Koch | |
| 2002/0189977 A1 | * | 12/2002 | Maehata | B03C 7/02 |
| | | | | 209/128 |
| 2015/0268099 A1 | | 9/2015 | Craig | |

* cited by examiner

ELECTROSTATIC POWDER FEEDER

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to metal processing techniques, such as welding and additive metal layering that use metallic powders to form a build. This invention relates more specifically to techniques for feeding metallic powders into equipment that creates the gas-powder stream used in laser metal deposition processes.

BACKGROUND OF THE INVENTION

Laser Metal Deposition (LMD) is an important Solid Freeform Fabrication (SFF) technology based on three-dimensional laser cladding. Similar to other processes such as Laser Engineered Net Shaping (LENS), Laser-Based Additive Manufacturing (LBAM) etc., LMD allows direct fabrication of functional metal parts directly from CAD solid models, as well as thin parts because the processing forces are low. It can also be used to repair parts; thus, reducing scrap and extending product service life.

In LMD, a laser beam is focused upon the surface of a substrate (workpiece) and generates a melt pool on the substrate. Metal powder is injected out through one or more delivery nozzles and into the focused laser beam. The conventional method of injection involves using high pressure inert gas such as argon to blow the metal powder out one or more delivery nozzles. The blown powder meets the laser beam and is absorbed and integrated into the melt pool, thus creating the "deposit" of the deposition process. The substrate is continually moved relative to the laser and powder injectors and layers are thereby added to the substrate. The blown-powder laser deposition process can produce fully-dense and metallurgically sound parts by this layered manufacturing method.

Many operational LMD quality control parameters depend on the characteristics of the gas-powder stream put out by the nozzles. Concentration of the powder is one such characteristic. The content of powder in the gas-powder stream has a large influence on the geometrical accuracy and the surface quality of the deposited buildup. FIG. 1 shows a schematic of a typical LMD system. The metallic particles injected into the laser beam are drawn from a feeding system through cylindrical inlets to the feeding nozzles. Insuring that the powder is efficiently and consistently fed to the powder delivery nozzles is critical to the LMD process.

Because the content of the gas-powder stream is an important factor in build quality, it is important that the powder be consistently and accurately metered into the carrier gas stream. Existing powder feeders, such as utilized in the system shown in FIG. 1, use mechanical structures to deliver metered powder flow. Typically, the metallic powder is drawn or pushed out of a powder reservoir via the action of a rotating wheel driven by a motor. Such mechanisms have certain deficits. In the first instance, mechanical powder delivery systems can create fluctuations in powder flow and often do not feed powder at a consistent rate. These fluctuations can create quality control issues in LMD systems that otherwise require consistent powder flow. Similarly, many existing mechanical powder feeding systems have difficulty producing a steady powder flow when low flow rates are required. This is primarily due to the fact that powder must be mechanically measured and dispensed.

Mechanical powder feeding systems also suffer from the fact that metal powder has a tendency to wear down and degrade anything with which it comes in motile contact. Additionally, mechanical powder feeding systems have another significant drawback that results from the fact that powder of any form will insert itself into any space, particularly those spaces between moving parts. In the case of metallic powders, such insertions often cause damage to moving parts. In view of the deficits of the prior art powder feeding devices, there is a need in the art for an improved powder delivery method and apparatus.

SUMMARY OF THE INVENTION

The invention overcomes the deficits of prior art powder feeders by providing for an improved method and apparatus for feeding powders, particularly those used in LMD processes. The present invention utilizes electrostatic forces as opposed to motorized pushing surfaces to effect powder motion rather than relying upon mechanical devices. This feature helps reduce wear to parts based upon frictional contact between the powder and surfaces of the feeder. In addition, due to the lack of a need for any motor driven parts, an electrostatic powder feeder of the present invention can be made smaller and lighter than mechanical delivery systems.

The invention works particularly well with powders commonly used in laser metal deposition operations, whether they be ferrous based or non-ferrous based metallic powders. The invention will also work with powders formed of any material that is not a strong insulator (i.e., that is somewhat conductive) and which allows for the formation of surface charges on the individual powder particles. As a general matter embodiments of a present invention system for feeding powder particles comprise a hopper or container adapted to hold a supply of powder particles. The hopper is situated above a first electrode and is configured to gravity feed the powder particles onto the first electrode. A second electrode is positioned at a distance from the first electrode. As is explained below the positioning of the second electrode vis a vis the first electrode is a design choice that at a fundamental level can initially be based upon whether the feeder will operate directly or stochastically on powder particles.

A voltage supply creates an electric potential between the electrodes, which in a preferred embodiment are spaced 5-10 mm apart. A preferable potential for this spacing will be between one thousand and ten thousand volts between the first and second electrodes. The hopper gravity feeds (drops) an amount of powder on the first electrode. The powder upon the first electrode, being somewhat conductive, develops an electric charge on its surface due to the potential difference between the electrodes. However, by virtue of the electric potential and the positioning of the second electrode relative to the first electrode, the powder particles with the surface charge on the first electrode are caused to move (jump) initially off the first electrode toward the second electrode. The second electrode is preferably above the first electrode, wholly or partially to the side of first electrode or both. In a direct mode feeder, the powder particles being caused to move toward the second electrode drop away from the second electrode due to the force of gravity. Preferably, the drawn particles will drop away before reaching the second electrode. Though even if they do reach the second electrode, they will eventually drop out of the feeder due to the force of gravity without ever re-contacting the first electrode or the powder pile upon it. With the stochastic mode feeder, the particles oscillate between the electrodes in a manner that imbues the particles with two or three dimensions of motion (as opposed to just one dimension of travel to and from electrodes) such that a percentage of the oscillating particles will eventually to a space in the feeder wherein the particles are no longer constrained between the electrodes and the force of gravity will allow them to escape the electrode space and be dispensed by the feeder.

Whether the direct or stochastic mode is utilized, the movement of the particles is controllable via modulating the electric supply on the electrodes. As a primary matter, it does not matter which electrode is positively or negatively charged. For best operation the electric potential voltage between the electrodes is a DC voltage or pulsed DC voltage. Varying the voltage between the electrodes can modulate the flow rate of dropping powder particles. Optimally, however, the power supply should generate fast pulses of high voltage to allow metering of the powder. The relationship between applied voltage and output powder flow rate is complex and non-linear. However, voltage pulses are controllable and predictable. In testing various prototypes utilizing the principals of the present invention system and method, increasing or decreasing the frequency of the high voltage pulses results in an increase or decrease in the flow rate in a predictable manner.

DETAILED DESCRIPTION

The inventions described herein exploit the principle that a charged particle in the presence of an electric field generated by two oppositely charged electrodes will experience a force proportional to the charge on the particle and the strength of the electric field at the location of the particle. Any conductive particle placed between oppositely charged electrodes and in contact with one of the electrodes will adopt a surface charge of the same polarity as the electrode with which it is in contact. The result is the following behavior: A group of one or more conductive particles resting between two oppositely charged electrodes, but in contact with one of the electrodes, can be induced to move or jump from the electrode on which it is resting towards the opposite electrode. This is because the particles, being at least somewhat conductive, will adopt a charge with the same polarity as the electrode on which they are resting. Then, due to the presence of the electric field created between the two oppositely charged electrodes, the particles will experience a force in the direction of the oppositely charged electrode.

Figure 1:
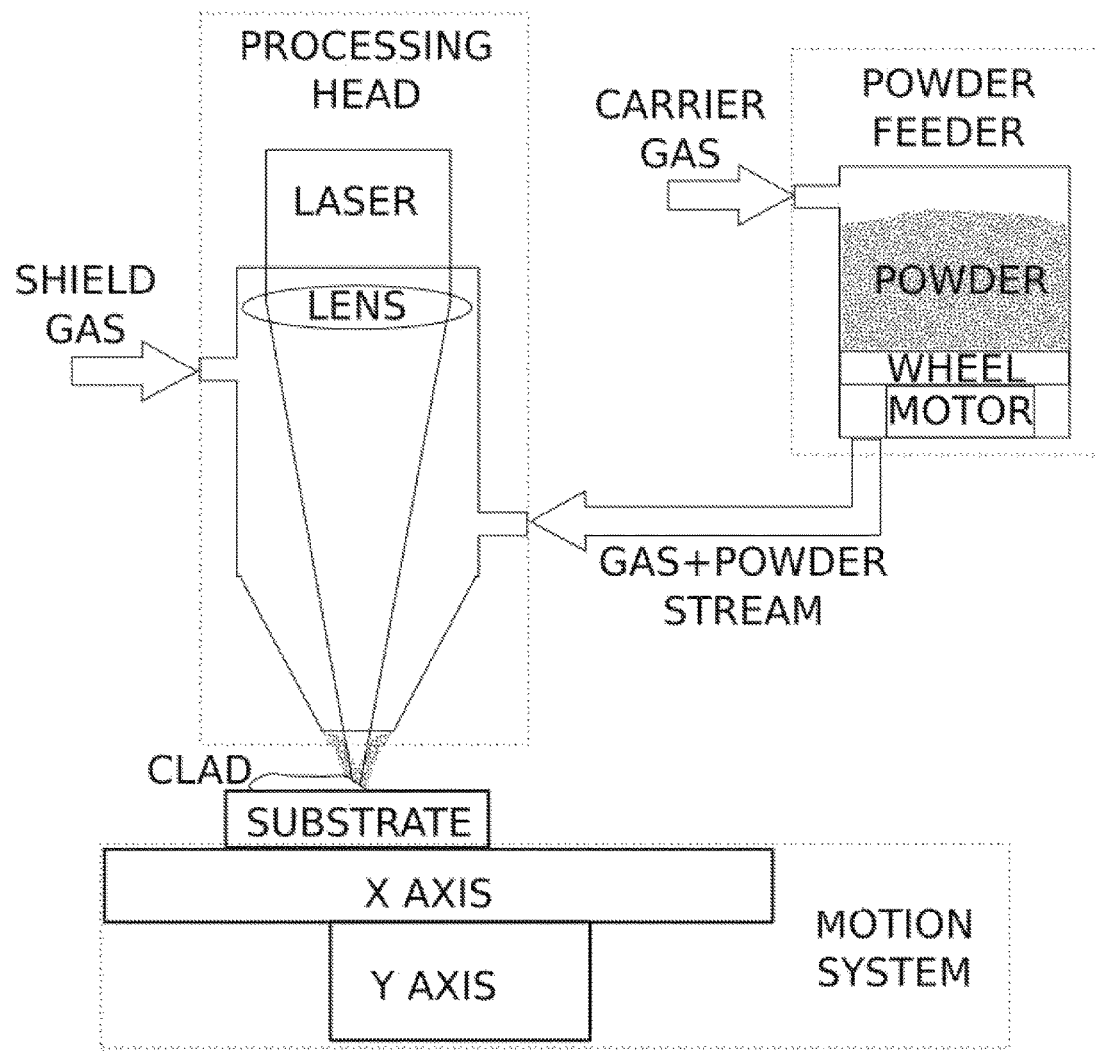
FIG. 1 is a schematic diagram of a typical prior art laser metal deposition system that relies upon an electro-mechanical device to push powder into a carrier gas stream.
Figure 2:
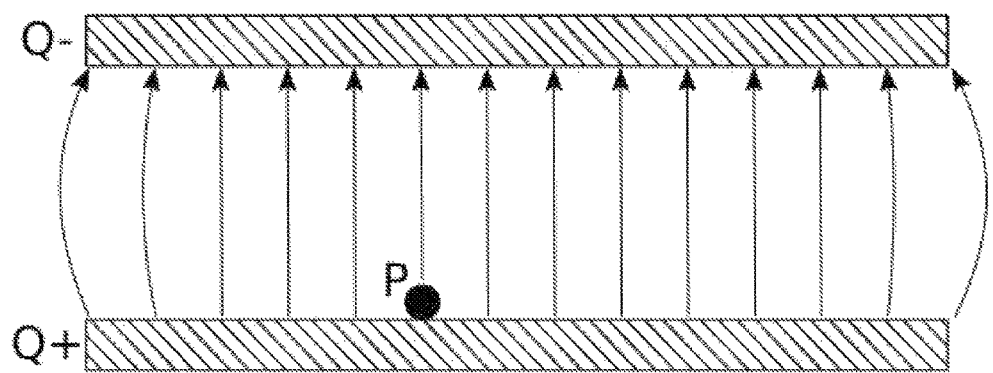
FIG. 2 depicts a simplified, exemplary arrangement of flat electrodes between which an electric field exists and acts upon a particle, P.

FIG. 2 shows an example simple system that demonstrates the above principles. In FIG. 2 conductive spherical particle P is located between two horizontal, flat and oppositely charged plates, Q+ and Q−, and subject to the electric field between the two plates. Particle P initially rests on the lower electrode Q+. Because the particle is now charged and in the presence of an electric field, a Coulomb force will appear on the charge in the upward direction. The charge on the particle, P, is calculated in Equation 1.

$$Q_P = \sigma A$$
$$= (E\varepsilon_0)(4\pi r^2)$$
$$= 4\pi\varepsilon_0 E r^2$$

Where Φ is the required potential, ρ is particle mass density, g is acceleration due to gravity, r is particle radius, and $\phi_0$ is the permittivity of free space, equal to 8.85×10⁻¹² F m⁻¹. The approximate Coulomb force on particle P is calculated in Equation 2.

$$F_P = Q_P E$$
$$= 4\pi\varepsilon_0 E^2 r^2$$

Thus, to overcome the force of gravity, the required potential difference between the two plates can be calculated via Equation 3 below.

$$F_P > F_g$$
$$4\pi\varepsilon_0 E^2 r^2 > \frac{4}{3}\pi\rho g r^3$$
$$E > \sqrt{\frac{\rho g r}{3\varepsilon_0}}$$
$$\Phi > d\sqrt{\frac{\rho g r}{3\varepsilon_0}}$$

Where d is the distance between the electrodes.

In practice, the required potential needed to generate a Coulomb force that is significantly higher than the force of gravity on particle P in order to lift particle P off of electrode Q+ should not just account for the field and gravitational forces, but also smaller forces which may be present, such as van der Waals forces.

Referring to FIG. 2, an important phenomenon occurs when the powder particle reaches the second electrode after being propelled upward. When the particle comes in contact with the upper electrode, the particle then adopts a surface charge density with the same polarity as the upper electrode, thus reversing its polarity. This means that the force, FP, on the particle due to the electric field between the electrodes reverses in direction. So, after contact with the upper electrode, the particle is accelerated towards the lower electrode. Then, the process can continue indefinitely, or until the particle exits the device. This principle has been confirmed in practice. The arrangement seen in FIG. 2 was constructed and 100 micron Ti-64 (Titanium) powder was placed between the plates. When voltage was applied, the powder particles began oscillating up and down. Eventually, due to random chance, the powder particles tend to bounce their way out from between the plates. The induced motion and the oscillation action described above can be used to create various configurations of powder feeders discussed in the sections below.

In the simplified example system shown in FIG. 2, a single particle is placed between two flat electrodes. In this arrangement, the electric field is constant between the electrodes. However, many different electrode geometries are possible, and changing electrode geometry affects the electric field strength and shape. For example, electrodes can be designed to increase electric field strength in some areas, while decreasing it in others. This can be useful for different methods of powder control and metering. In modulating movement of the charged powder particles the strength of the electric field is a key factor. Field strength is primarily a function of voltage and electrode geometry. Hence, in the context of electrostatic powder feeders, the electric field can be thought of as a tool to apply a desired force on the particles, and electrode geometry and voltage can be used to create a desired electric field.

There are certain real-world factors that must be taken into account when building devices relying upon moving particles via an electrostatic force. For example, the voltage between the electrodes is generally limited by the dielectric strength of the gas present in the feeder and the insulating material the feeder is made from. The gas in the powder feeder is often air, but could also be argon or other gases to prevent powder oxidation. If the voltage is increased beyond a certain limit, the gas in the feeder will undergo dielectric breakdown, or arcing. Arcing within the powder feeder would usually be considered a catastrophic failure, so the design of the powder feeder should prevent this from occurring. Additionally, in actual operation on an electrostatic feeder, instead of a single particle being present between the electrodes (FIG. 2), a pile of particles is present. It is thus often convenient to treat the powder pile itself as the lower electrode. Because the powder is conductive, charge can flow through the powder pile from a connection to the high-voltage supply rather than directly to each particle to be propelled. In fact, for all of the powder feeders described herein, charge must be able to flow through the powder pile to the particles on the top of the pile. Taking into account the above principles, concerns and factors, various types of powder feeders can be created to enhance the laser deposition process.

Figure 3:
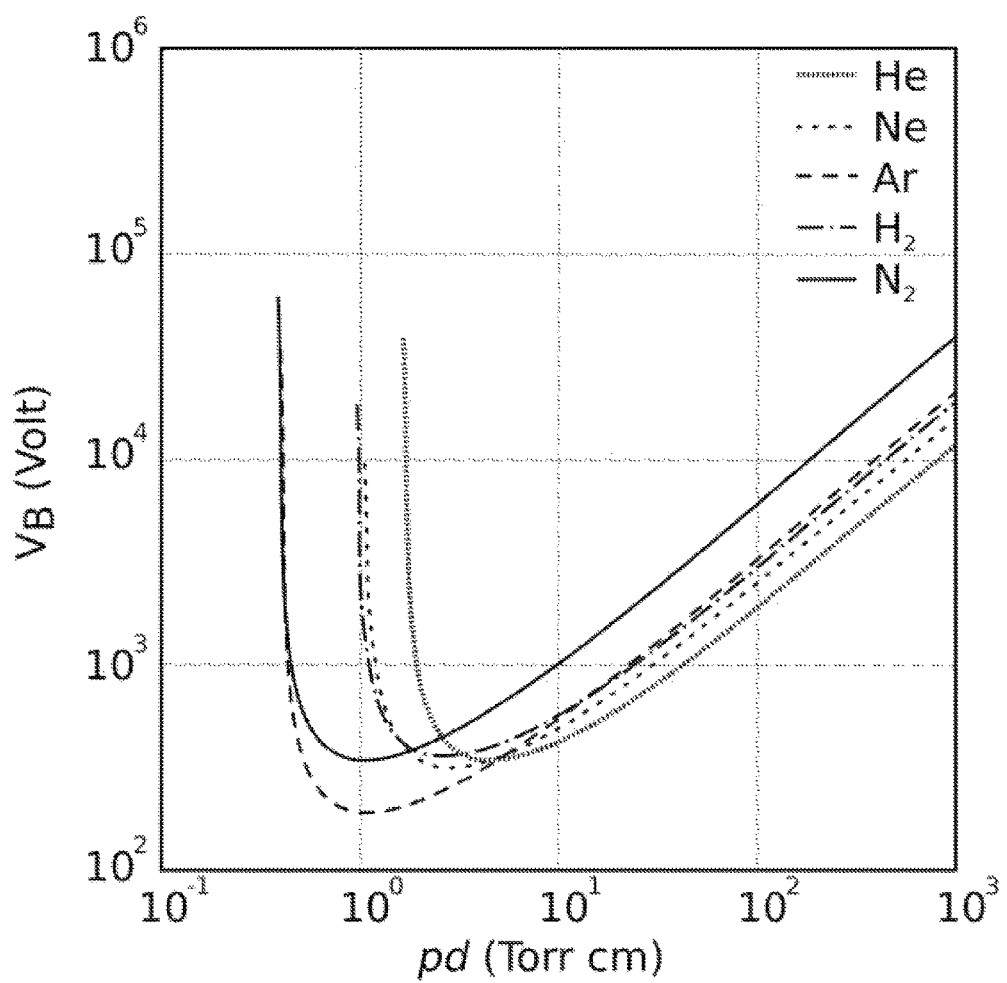
FIG. 3 shows Paschen curves for various gases.

Pressure also plays a large role in determining dielectric strength of a gas. The relationship between pressure and dielectric strength is characterized by Paschen's Law. FIG. 3 shows Paschen curves for various gasses. These curves represent the maximum voltage that a gas can withstand for a given pressure-distance product, pd. (The pressure-distance product being the pressure of the gas multiplied by the distance between electrodes). The Paschen curves in FIG. 3 show a sharp increase in dielectric strength as pd approaches zero. One possible method to increase the maximum voltage that the powder feeder can withstand without undergoing dielectric breakdown is by operating the feeder at a reduced pressure or a vacuum. Increasing the maximum voltage would potentially allow for more flexibility in the design. For example, a smaller distance between electrodes would be allowed, or larger/more dense powder particles could be used.

Figure 4:
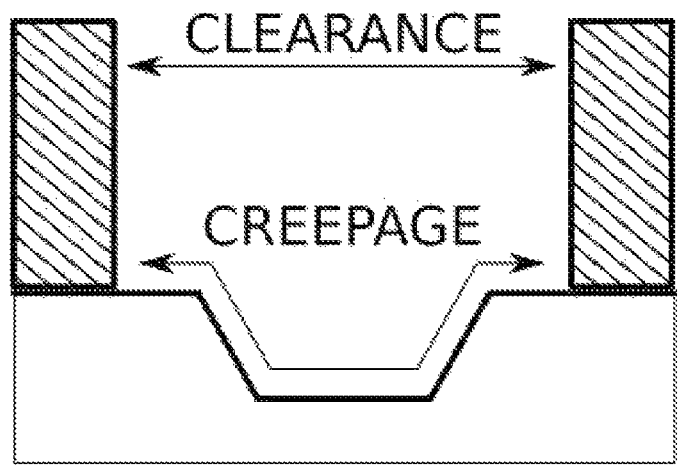
FIG. 4 graphically depicts the relationship and differences between clearance and creepage in an electrode system.

System clearance and creepage are also factors that must be considered in building electrostatic systems. FIG. 4 graphically shows the difference between creepage and clearance. Clearance is the shortest path distance between any two points on the electrodes, whereas creepage is the total distance along the surface of the bounding insulators between the electrodes. Creepage distance is an important factor to consider in electrostatic feeder designs because powder, moisture, and other contaminants can accumulate on the surface of the insulation between two electrodes, allowing an arc to form along the surface, even if the clearance distance is larger than the required length to prevent direct arcing. Powder feeders should be designed with sufficient clearance and creepage distance such that arcing is not possible.

Practically speaking, an electrostatic powder feeder can operate and dispense powder particles either directly or stochastically. In a direct-mode embodiment powder particles are drawn straight from a source pile out of the device without ever making subsequent contact with the first electrode or its source pile. With a stochastic mode apparatus, the electrodes are placed relative to each other and an escape aperture in the feeder. In a stochastic mode feeder the majority of the particles bounce around a number of times before they exit the feeder. In a direct mode feeder, the majority of the particles exit the feeder without bouncing around. (It is possible to have a system that operates in both modes—i.e., a hybrid feeder where some powder bounces around and some directly exits.)

Figure 5:
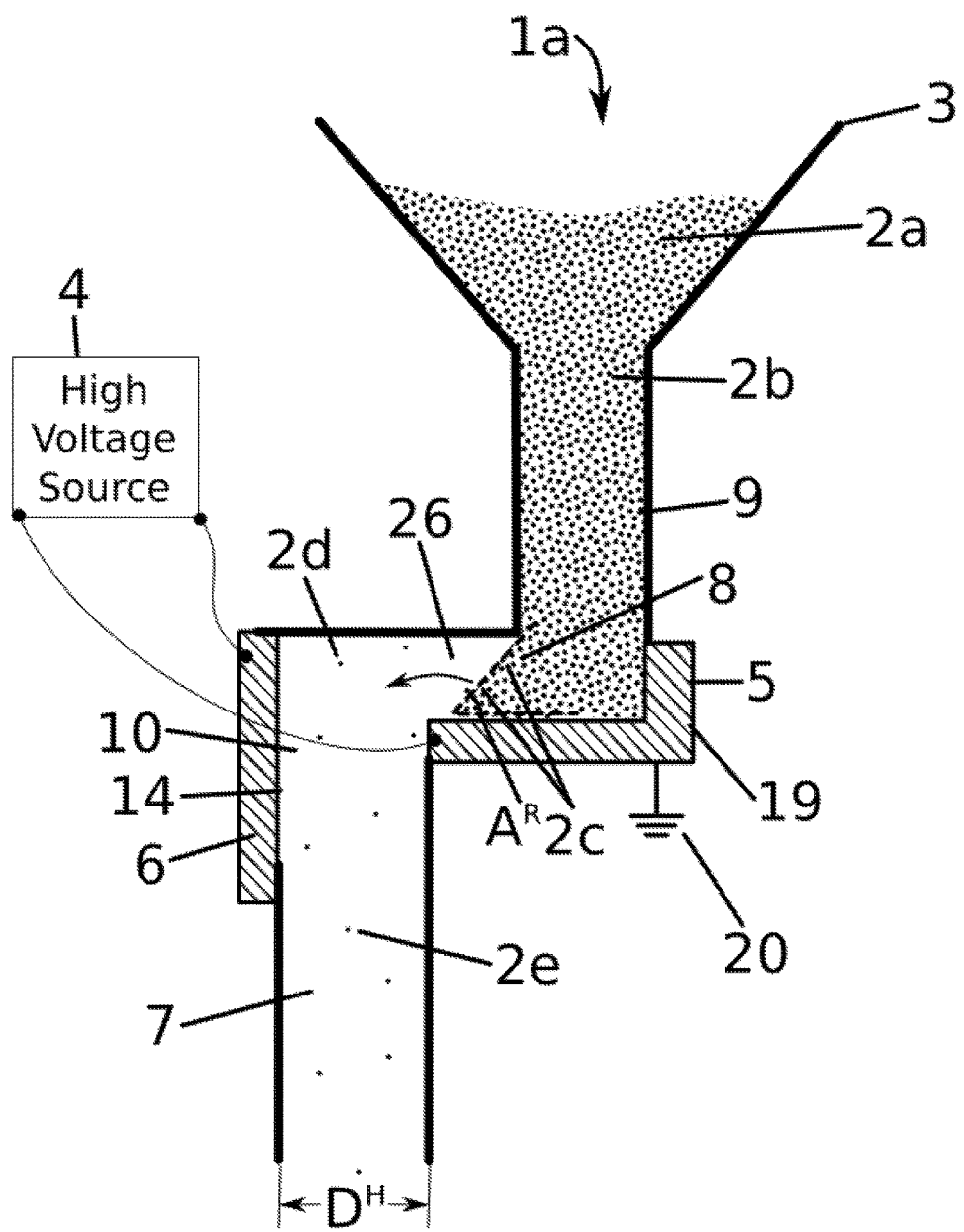
FIG. 5 depicts the inner arrangement of structures of an exemplary linear direct mode electrostatic feeder system.

An example of a direct mode electrostatic powder feeder is shown in FIG. 5. Generally speaking, with a direct mode electrostatic feeder, the polarity of the electrodes does not matter. The force created by the electric field causes the powder particles on the first electrode to "jump" out of the pile and travel toward the second electrode. The second electrode is preferably positioned so that all or part of it is at a higher vertical level than the first electrode. This requires the particles leaving the powder pile on the first electrode to be continually subject to a gravitational force that is counter to the electrostatic force causing them to move. While the particles are "in flight" gravity can act upon them and draw them down and away from the second electrode such that the particle can exit the device. The powder does not necessarily need to come in contact with the upper or second electrode. In fact, it is preferable that the particles traveling from the first electrode to the second electrode do not reach the second electrode as that would provide for a more fluid motion of particles. Those particles that do reach the second electrode will lose their surface charge and drop out of the device to be dispensed into the gas stream without ever making subsequent contact with the first electrode or the powder particles resting upon it. While the polarity of the electrodes does not matter, it is preferable for the first electrode to be connected to earth ground. Because the powder itself is at least somewhat conductive, grounding the first electrode has the effect of electrically grounding the entire powder supply. This is an important optimization because if the powder is held at a high electric potential with respect to ground, powder particles may begin to jump from the top of the hopper. In essence, without grounding the first electrode, and therefore the powder particle supply, the same electrostatic forces which allow the operation of electrostatic feeders can cause the powder particles in the hopper to be propelled from the top of the device.

Figure 6:
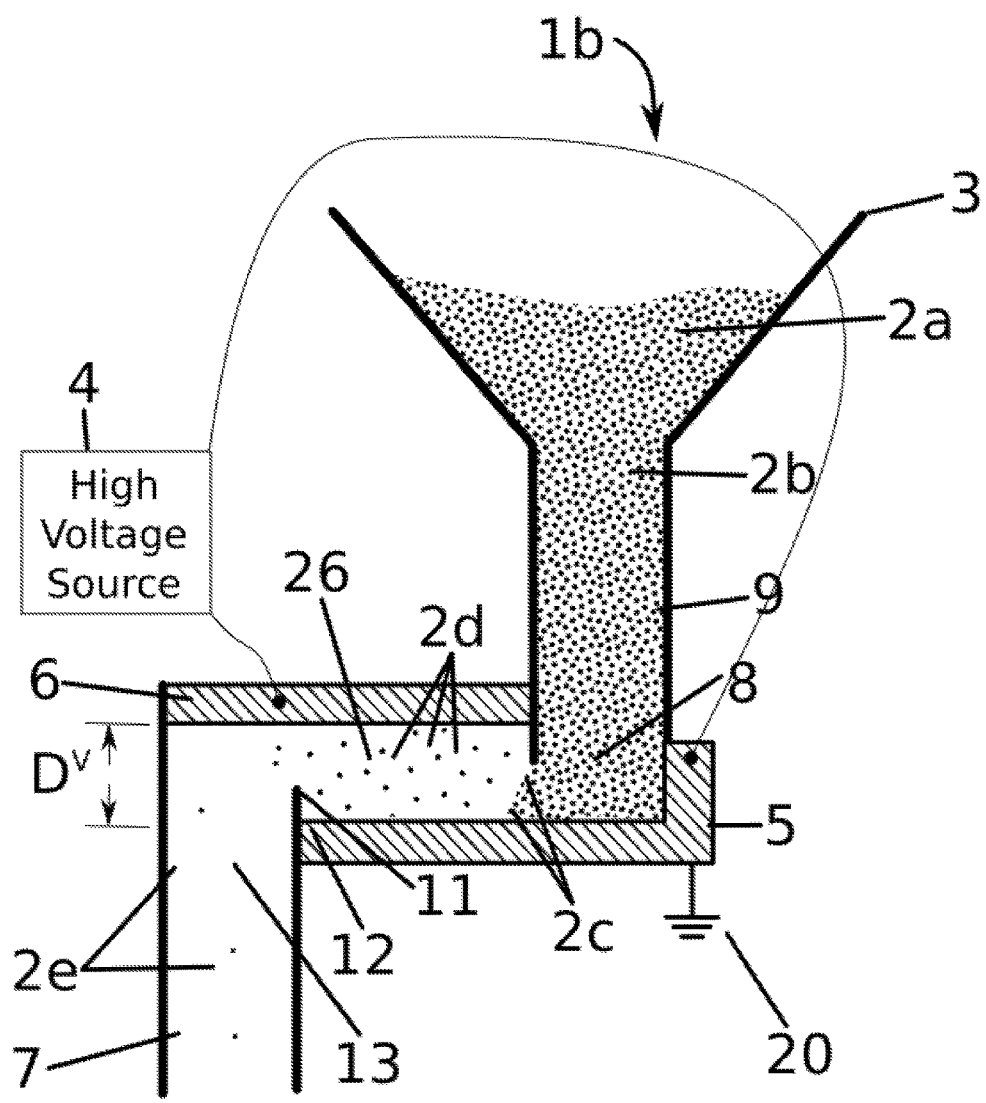
FIG. 6 depicts the inner arrangement of structures of an exemplary linear stochastic mode electrostatic feeder system.

An example of a linear stochastic mode electrostatic powder feeder is shown in FIG. 6. In this type of feeder, once a particle passes through an escape aperture there is no electric field component that will keep the particle between the two electrodes and gravity acts upon the particle to cause it to leave the feeder. Hence, in order to leave the feeder, the particles acted upon by the electrodes must pass through the escape aperture. However, the particles are not simply linearly pulled through the escape aperture. Instead, the electrode placement causes particles to oscillate between the electrodes and this oscillation results in three dimensional motion. The three dimensional motion of the particles means that, though the particles are not in the aggregate being directly pulled through the escape aperture, simply by the operation of statistics, a certain number of particles will always end up passing through the escape aperture and escape the feeder. Thus, as a fundamental choice, a system developer has the option to utilize a powder feeder that operates in a "direct" or "stochastic" mode.

The structures of the various embodiment feeders will now be discussed with reference to the drawings. In the drawings each overall apparatus is designated by a numeral 1 with small case letters added to distinguish the embodiment apparatus based upon its features (e.g., direct or stochastic). Similarly, powder particles are generally designated with a numeral 2 with small case letters added to distinguish the status of the particles along their feeding path from the hopper to the gas stream.

FIG. 5 depicts the inner arrangement of structures of an example embodiment direct-mode feeder. As shown in FIG. 5, embodiment apparatus 1a comprises a hopper 3 adapted to hold a supply of powder particles 2a, which preferably are metallic or conductive powder particles. Apparatus 1a further includes a voltage supply 4 in electrical communication with a first electrode 5 and a second electrode 6. Lower electrode 5 is connected to earth ground 20. Hopper 3 is configured to gravity feed powder particles 2a onto first electrode 5. Powder particles 2b falling onto first electrode 5 create a powder pile 8. In first embodiment apparatus 1a, second electrode 6 is positioned at a horizontal distance $D^H$ from first electrode 5 in chamber 26. The electric potential between first electrode 5 and second electrode 6 causes powder particles 2b that fall onto first electrode 5 to develop a surface charge. Those powder particles on first electrode 5 with a surface charge are designated in the figures with the reference indicator "2c."

The potential difference and relative positioning of electrodes 5, 6 in chamber 26 is such that electrostatically charged powder particles 2c on the top of pile 8 are caused to move toward second electrode 6. Those particles moving toward second electrode 6 are designated in the figures with the reference designation "2d." However, by virtue of the positioning of electrodes 5, 6, not all of particles 2d reach second electrode 6, but instead drop away from second electrode 6 due to the force of gravity and exit the feeder through chute 7. Powder particles dropping away from second electrode 6 are designated with reference designation "2e" in the figures. Descending particles 2e are delivered out the apparatus and into gas stream ductwork (not shown in FIG. 5) via dispensing chute 7.

Thus, it can be seen from FIG. 5 that powder 2a is stored in hopper 3. That powder falls (falling powder particles designated 2b) through a preferably rectangular cross-section channel (chute) 9 until it reaches a horizontal structure 19, which causes the powder (now designated 2c) to form pile 8 with an angle roughly equal to the angle of repose $A^R$ of the powder. Horizontal structure 19 blocks powder 2b from flowing out of the hopper and causes it to pile up. Horizontal structure 19 can be or can include lower electrode 5, the important requirement being that powder pile 8 is put in direct contact with lower electrode 5. Powder particles 2c on the surface of pile 8 experience an electrostatic force propelling them toward second electrode 6. To the side of the first electrode 5 is the top 10 of chute 7. Second electrode 6 is positioned remote from pile 8 on the distal side 14 of chute 7. After powder particles 2c leave pile 8 and move toward second electrode 6 (those moving powder particles designated as 2d), they fall out of the feeder (particles 2e) down chute 7. In the embodiment apparatus shown in FIG. 5, second electrode 6 is spaced apart horizontally from first electrode 5, with portions of second electrode 6 positioned at heights below, equal to and above that of first electrode 5. Preferably at least a portion of second electrode 6 is positioned above the top 10 of chute 7 through which powder will exit. The positioning of second electrode 6 vis a vis electrode 5 can be altered based upon the desired motion of path of particles 2d and 2e.

In the prototype apparatuses used to test the concepts herein described an electrode spacing of 5-10 mm was used, with most applications functioning well at a spacing of 5-6 mm. In these prototype systems a voltage supply 4 capable of producing an electric potential of between 1 thousand and 10 thousand volts between first electrode 5 and second electrode 6 was found preferable. Electrode spacing is based mainly upon voltage applied, powder size and density. Spacing and voltage are 1:1 coupled when determining particle flow. Though it is possible to modulate particle flow by varying electrode spacing, it is preferable that particle flow not be modulated that way in a direct mode feeder. Adding a spacing-altering feature would mean that the feeder would have moving parts and the inclusion of moving parts in a powder environment can create performance and maintenance issues.

Thus, in a direct flow system such as is shown in FIG. 5, it is preferable that particle flow be modulated via electrical modulation of the electrodes. One modulation method involves controlling the voltage across the electrodes. In this respect, particle flow rate can be controlled by changing the voltage applied between the electrodes. An increased voltage leads to a higher electric field, which, results in more electrostatic force applied to the particles. More force on the particles results in a higher acceleration as the powder particles leave the pile, leading to a higher feed rate.

Particle flow can also be modulated via a pulse technique. To wit, rather than applying a constant voltage between the electrodes, a pulsed voltage can be applied. This results in powder jumping from the source pile only when high voltage is applied (only when a pulse is active). When the pulse is inactive, powder particles are stationary, and not leaving the feeder. For example, if each high voltage pulse results in 10 micrograms of powder leaving the feeder, then a pulse frequency of 100 Hz would lead to a feed rate of approximately 1 milligram/second. Another way to modulate flow rate is by restricting current. As powder is being fed through the feeder, a small amount of current is flowing due to the charge on each particle moving from one electrode to another. In theory, it would be possible to restrict the amount of current flowing through the electrodes, resulting in a reduction in powder flow rate.

Figure 7A:
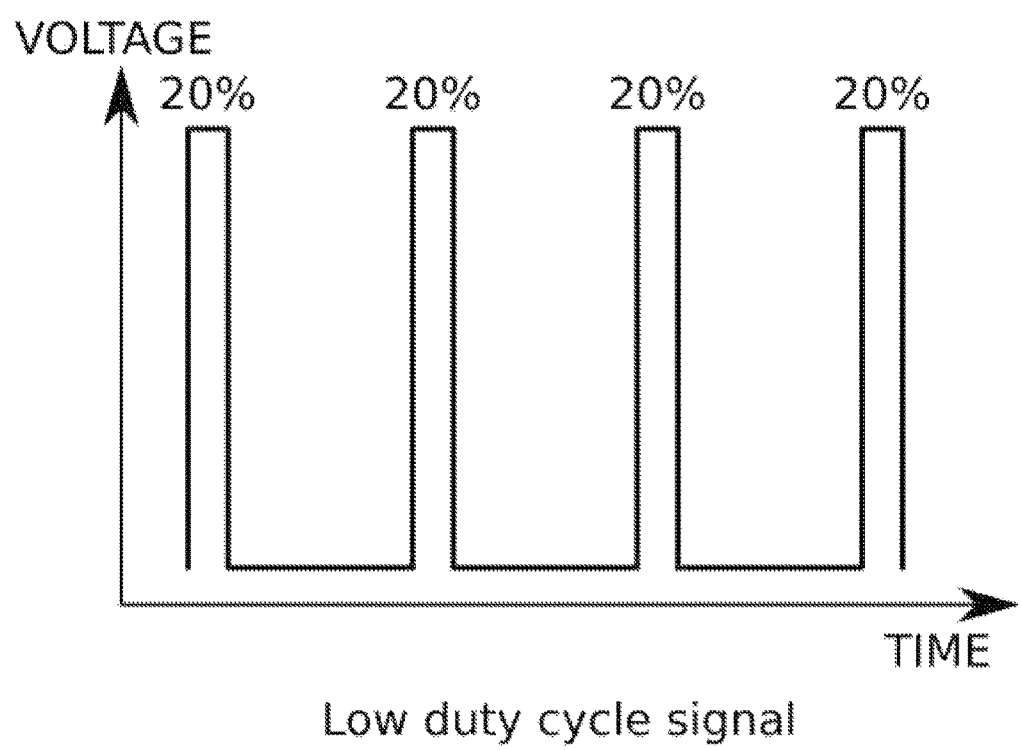
FIGS. 7A and 7B depict exemplary duty cycle voltage control signals.
Figure 7B:
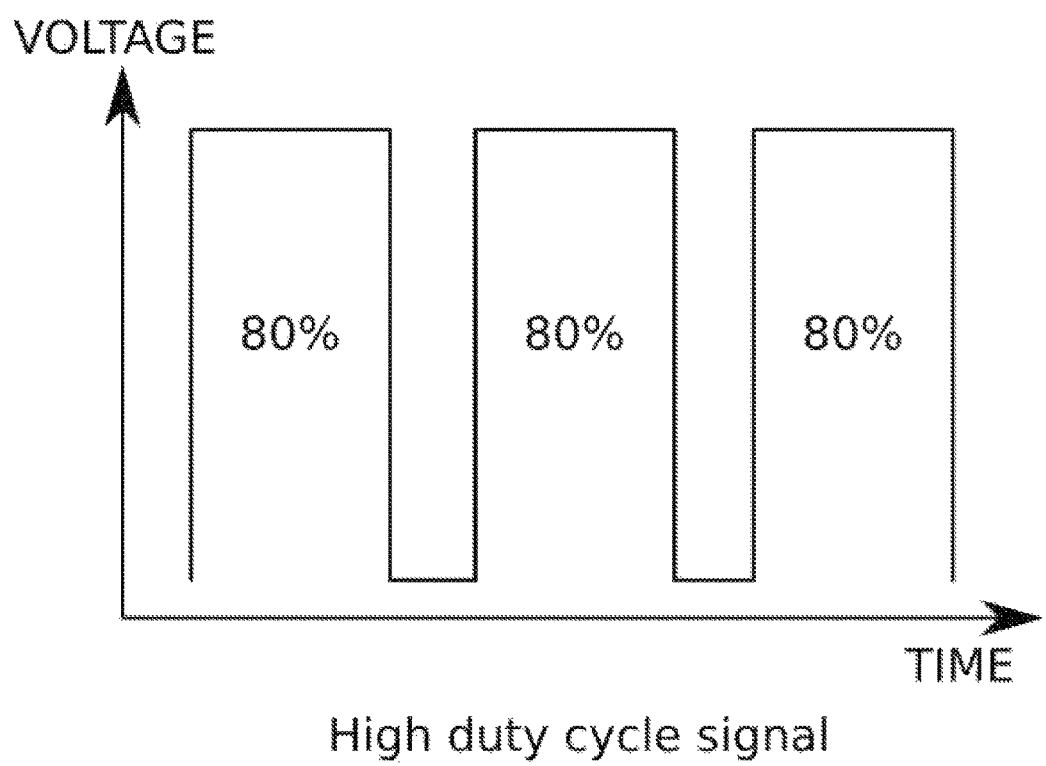

Particle flow modulation can also be approached using a duty cycle approach. This method is similar to the frequency control method as duty cycle control also requires a pulsed voltage be applied between the electrodes. However, in duty-cycle control, the width of each pulse, rather than the frequency of pulses, determines feed rate. A longer high-voltage pulse duration means more "on-time" during which the powder particles experience an electrostatic force. FIGS. 7A and 7B show examples of voltage over time for high and low duty cycles. Notice that the frequency is steady, whereas the width of the pulses changes in order to raise or lower the powder feed rate.

It is often useful to know how much powder is flowing from a powder feeder. For example, this information can be used to create a closed-loop control system. If the actual feed rate is known precisely, then the powder feeder control system can use this information to either increase or decrease the voltage, frequency, duty cycle, etc. in order to achieve a desired flow rate value. One method currently used in existing mechanical powder feeder designs for mass flow feedback is simply measuring the mass of the entire feeder system using a load cell, similar to a load cell found in common digital scales. As the powder feeder delivers powder, the mass of the system drops over time due to powder leaving the device. The difference in mass is equal to the mass of powder delivered.

In the present invention particle flow can also be measured by observing the electrical current flow through the device using an ammeter. This can be done because each time a charged powder particle moves from one electrode to the other, it carries a small amount of charge. Electrical current is the amount of charge carried over a given period of time. So, by measuring the average electrical current through the powder feeder with an ammeter, a powder flow rate can be predicted. As powder is being fed through the feeder, a small amount of current flows due to the charge on each particle moving from one electrode towards the other. More particles moving between the electrodes means a higher electrical current is flowing between the electrodes. Thus, by measuring the current flowing through the device, an estimate of the particle flow rate can be obtained. The flow rate information can then be used to create a closed-loop system herein the high voltage electrical signal is modulated based on electrical current feedback. By measuring and adjusting the high voltage signal based on electrical current measurements, a more accurate particle flow rate can be achieved than with an open-loop system.

An electrostatic feeder may also be constructed in reliance upon stochastic principles. The inner arrangement of structures of such a feeder is disclosed in FIG. 6 and labeled 1b. In a stochastic embodiment system or apparatus, the electrodes are intended to oscillate particles in the enclosed chamber or confined area rather than pull the particles directly out of the pile. Once particles are oscillating within the feeder, a small escape aperture on the side wall or bottom of the chamber allows any particle that happens to bounce through that escape aperture to exit the feeder. Hence, in stochastic feeders, statistics plays a larger role in determining the feed rate of the powder feeder. For the stochastic mode of operation, the electrostatic forces generated by electrodes 5, 6 in chamber 26 create a primary force that move the particles up and down (i.e., provide one dimensional motion). Particles in chamber 26 must also have a horizontal component in order to exit chamber 26 and device 1b. As far as the horizontal motion components are concerned, these motion components arise from several interactions including, interparticle collisions, the electrostatic attraction and repulsion forces between particles in flight and collisions with the floor and ceiling surfaces of the chamber. Horizontally offsetting electrodes 5, 6 biases the horizontal movement toward an escape aperture 16.

As shown in FIG. 6, embodiment apparatus 1b comprises a hopper 3 adapted to hold a supply of powder particles 2a. Apparatus 1b further includes a voltage supply 4 in electrical communication with a first electrode 5 and a second electrode 6. Electrode 5 is connected to earth ground 20. In the apparatus depicted in FIG. 6, an electrode spacing of 5-10 mm is preferable. Voltage supply 4 is preferably capable of producing an electric potential of between 1 thousand and 10 thousand volts between first electrode 5 and second electrode 6. In embodiment apparatus 1b, second electrode 6 is positioned at a vertical distance $D^V$ from first electrode 5. However, as noted in the immediately above paragraph, second electrode 6 is preferably not vertically aligned with electrode 5 such that a portion or portions of electrode 6 overhangs electrode 5. Hopper 3 is configured to gravity feed powder particles 2a onto first electrode 5. Powder particles 2b fall through chute 9 and onto first electrode 5 to create a powder pile 8 that includes particles 2c. Embodiment apparatus 1b includes retaining barrier 11 positioned at the distal end 12 of electrode 5 so as to aid in the accumulation of powder particles 2c on electrode 5 and block the direct horizontal pulling of particles 2c by electrode 6.

Embodiment apparatus 1b includes a chamber 26 formed with first electrode 5 and second electrode 6. The first electrode and second electrode create an electric field within the chamber. Barrier 11 along with the other chamber confines shown in the depicted embodiment form chamber escape aperture 16. Voltage supply 4 is capable of producing an electric potential between first electrode 5 and second electrode 6 and causing the powder particles being fed onto first electrode 5 to develop a surface charge and then by virtue of the creation of that surface charge move off first electrode 5 and oscillate in the electric field space in chamber 26. Powder particles 2d oscillating in the field space can exit chamber 26 through escape aperture 16 in chamber 26 through which powder particles 2d oscillating in the field space can exit chamber 26 and drop away from chamber 26 due to the force of gravity.

Because of the vertical arrangement of electrodes 5, 6 powder particles 2c on the surface of pile 8 leave pile 8 and begin to oscillate up and down between electrodes 5, 6. (The oscillating particles are designated as particles 2d.) However, due to the horizontal offset of electrodes 5, 6, the particle-particle interactions and particle-chamber surface interactions, particles 2d also have a horizontal motion component that causes the particles to move horizontally relative to upper portion 13 of chute 7. The combination of vertical and horizontal motion component allows a certain number of traveling particles 2d to clear retaining barrier 11 and reach upper portion 13 of chute 7 through escape aperture 16. Those particles clearing barrier 11 (particles 2e) are then acted upon by the force of gravity and proceed through and out chute 7 into the carrier gas ductwork.

As with the direct-mode embodiment shown in FIG. 5, the polarity of the electrodes 5, 6 of apparatus 1b does not matter. Powder particles 2d at the distal end 12 of electrode 5 and moving away from electrode 5 do not necessarily need to come in contact with upper or second electrode 6 once past barrier wall 11.

Figure 8:
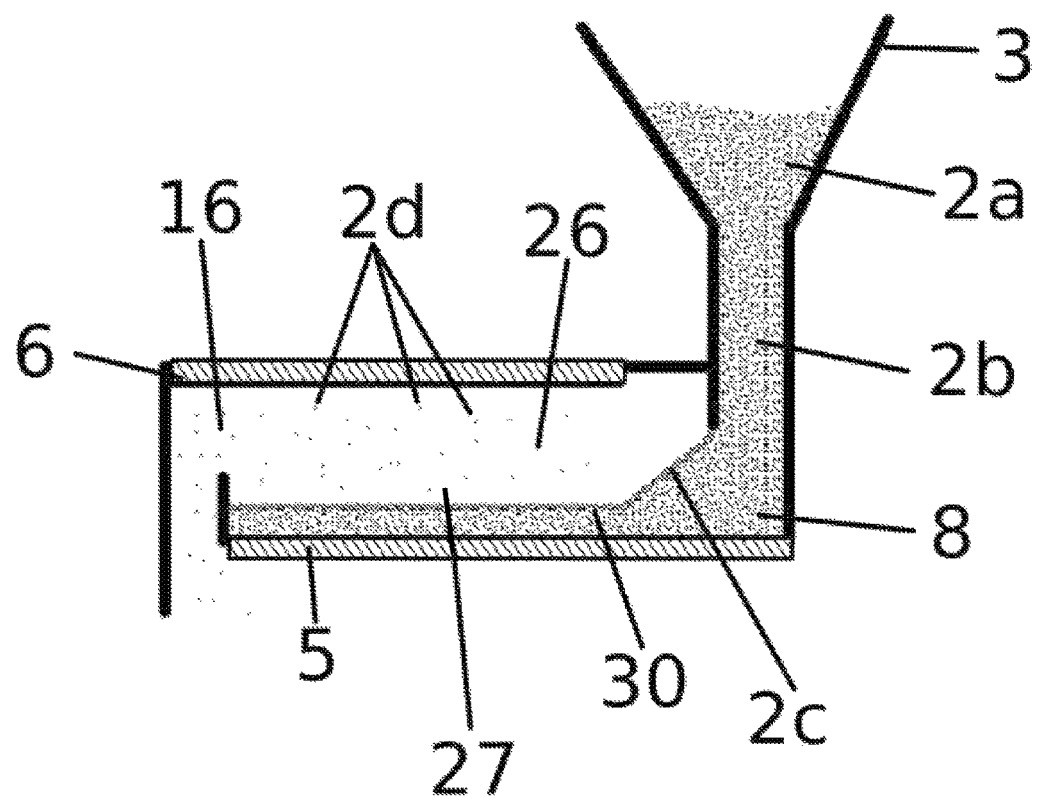
FIG. 8 depicts a stochastic feeder arrangement in which powder equilibrium exists.

In developing stochastic electrostatic systems, it was expected that if the size of the outlet was too small, then powder will continue to fill the chamber until the spacing between the accumulated powder and the upper electrode is small enough that arcing begins to occur. However, it has been experimentally determined that this isn't necessarily the case. A stochastic feeder can be designed such that when the feeder's output is manually blocked such that no powder can exit the feeder, eventually the amount of powder in the area between the electrodes, (hereafter referred to as 'idle powder') reaches a maximum. This occurs when the idle powder fills the lower area of the feeder to the point where it is blocking more powder from the hopper from entering the chamber. At this point, idle powder continues to oscillate between the electrodes, but no more powder is fed from the hopper into the chamber. Then, when the blockage is removed, powder resumes feeding through the device. This means that if very low powder flow rates are required, the escape aperture can be designed to be so small that the vast majority of the powder bouncing in the chamber does not exit the feeder without fear of build-up and arcing. Instead, most of the powder will accumulate in the bottom of the feeder and continue to occasionally bounce until it happens to fall through the escape aperture. FIG. 8 shows what a powder feeder operating in this state looks like.

In FIG. 8, note the flat bed 30 of idle powder accumulated in bottom 27 of chamber 26. Flat bed 30 of powder appears when escape aperture 16 is sufficiently small, and consists of powder which was unable to exit through the outlet. Powder that doesn't exit through the outlet stays inside the chamber, bouncing occasionally, until it eventually does exit, at which point it will be replenished by powder from the hopper. The oscillations and statistical properties of stochastic feeders tend to "smooth" out any inconsistencies that might occur. It acts as a sort of low-pass filter for powder flow. This smoothing property could be used to improve the characteristics of existing powder feeders. A stochastic powder feeder could be added as a second stage of another powder feeder (direct-mode, or even an existing mechanical powder feeder). The result would be a more consistent powder flow. The flat bed is an important optimization because it presents a relatively constant powder pile surface shape, independent of powder properties such as angle of repose $A^R$.

As with direct mode feeders, flow rate in stochastic feeders can be controlled by changing the voltage applied between the electrodes. An increased voltage leads to a higher electric field, which, results in more electrostatic force applied to the particles. More force on the particles results in more particles oscillating within the chamber at a faster rate, increasing the likelihood that a particle exits the feeder. Additionally, a higher voltage increases the bias force created by the horizontal misalignment of the electrodes, which pushes more particles toward the exit Like in direct-mode feeders, stochastic feeders could also use frequency control to modify the powder flow rate. Each high voltage pulse results in the powder in the chamber jumping" upward towards the upper electrode. A percentage of the powder that jumps ends up escaping through the outlet. Increasing the frequency of these pulses thus results in a direct increase in the amount of powder leaving the feeder. Stochastic mode feeders can be controlled by current restriction as well. In stochastic mode feeders, powder particles are constantly bouncing between the two electrodes. Each time a particle touches one electrode and then travels to the other electrode, the particle carries a small amount of charge. Electrical current is the amount of charge that flows per unit of time. So restricting the current results in a restriction in the amount of powder particles that can flow.

In stochastic feeders, particle flow can also be measured by observing electrical current flow. As powder is being fed through the device, powder particles are constantly bouncing between the two electrodes. Each time a particle touches one electrode and then travels to the other electrode, the particle carries a small amount of charge. Electrical current is the amount of charge that flows per unit of time. Thus, by measuring the current flowing through the device with an ammeter, an estimate of the particle flow rate can be obtained. As with direct mode powder feeders, the flow rate information can then be used to create a closed-loop system wherein the high voltage electrical signal is modulated based on electrical current feedback. By measuring and adjusting the high voltage signal based on electrical current measurements, a more accurate particle flow rate can be achieved than with an open-loop system.

Alternatively, due to the equilibrium concept discussed above, another control method for stochastic feeders is to physically restrict the output of the feeder with a sliding "blocker" which changes the size of the outlet. A smaller outlet would lead to fewer powder particles escaping the feeder. Although this method has the disadvantage of requiring a moving component, it can allow for flow rate controllability.

Figure 9A:
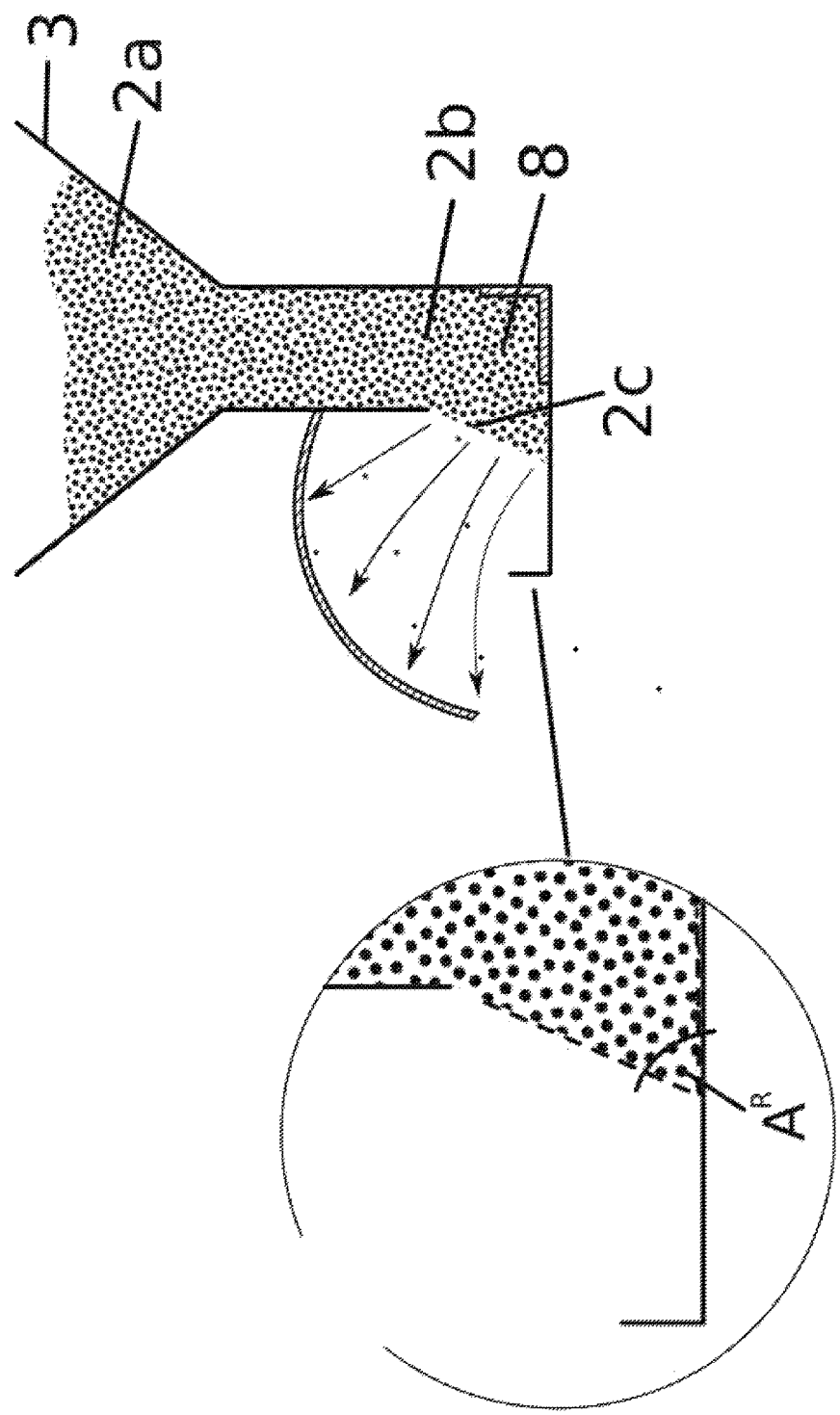
FIGS. 9A and 9B depict the effect differing angles of repose $A^R$ have in a direct-mode electrostatic feeder system.
Figure 9B:
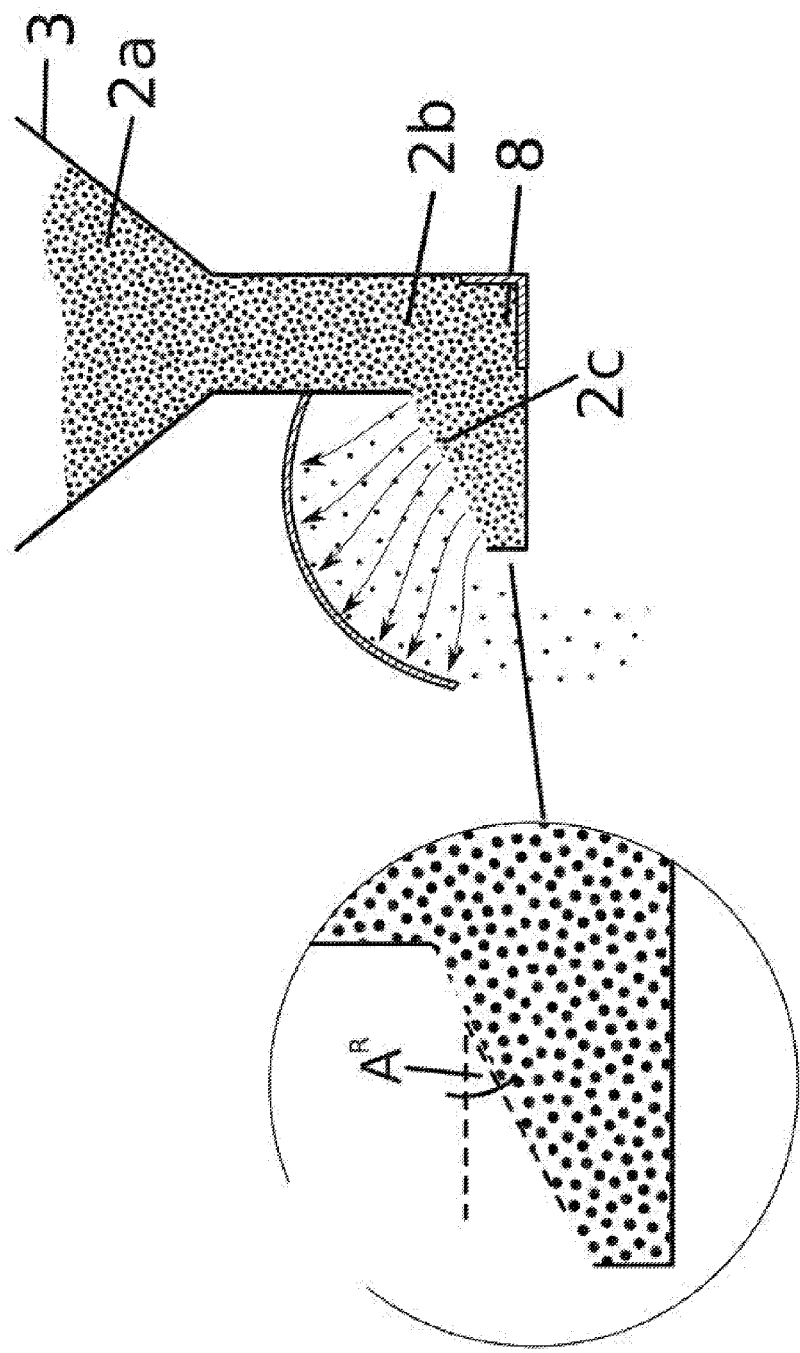

The oscillations and statistical properties of the stochastic feeder tend to "smooth" out any inconsistencies that occur upstream of the powder feeder. The stochastic embodiment is more resistant to any inconsistent upstream flow or pulses of powder from the hopper, and results in an overall more consistent powder output. Different metal powders can have vastly different behaviors depending on their characteristics. One critical characteristic is the angle of repose $A^R$. In a direct-mode feeder, the angle of repose $A^R$ can have a significant effect on feed rate. FIGS. 9A and 9B show how a different angle of repose $A^R$ may have an undesirable effect on powder feed rate with direct-mode powder feeders. A higher angle of repose $A^R$ increases the distance between the powder pile and the upper electrode. This results in a reduced electric field strength and thus less flow. In contrast, powder feed rate in stochastic feeders, especially stochastic feeders which exhibit the "powder bed" feature discussed above, is more related to the amount of powder that is able to exit through the small escape aperture. Because the amount of powder that is able to exit through the escape aperture is mostly independent of the angle of repose $A^R$, there is less of an effect from angle of repose $A^R$ on the powder feed rate characteristics.

Regardless of the mode or topology of the feeder electrodes, the voltage between electrodes 5, 6 is preferably a DC voltage or pulsed DC voltage. More preferably, the power supply should generate fast pulses of high voltage. The relationship between applied voltage and output powder flow rate is complex, non-linear and thus modulation of feed rate via straight-forward voltage changes has proved complicated. Voltage pulses however are more controllable and predictable. In prototypes, increasing or decreasing the frequency of the high voltage pulses does appear to increase or decrease the flow rate in a more predictable manner than simply varying the voltage.

Figure 10A:
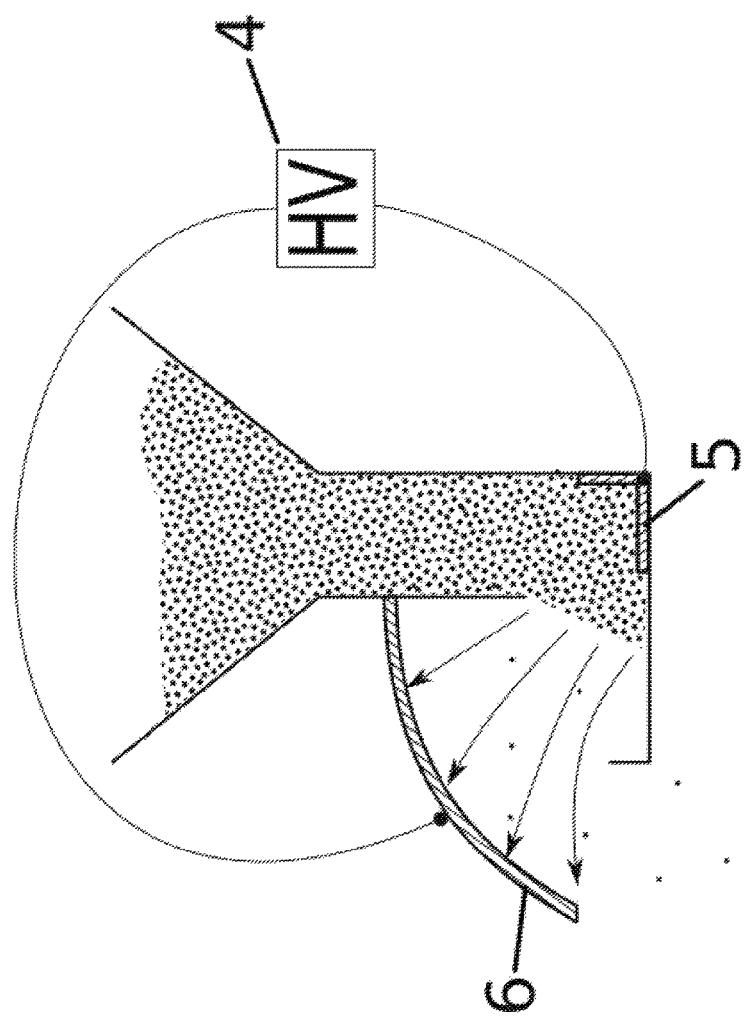
FIGS. 10A-10G depict possible alternate embodiment electrodes of differing shape and location
Figure 10B:
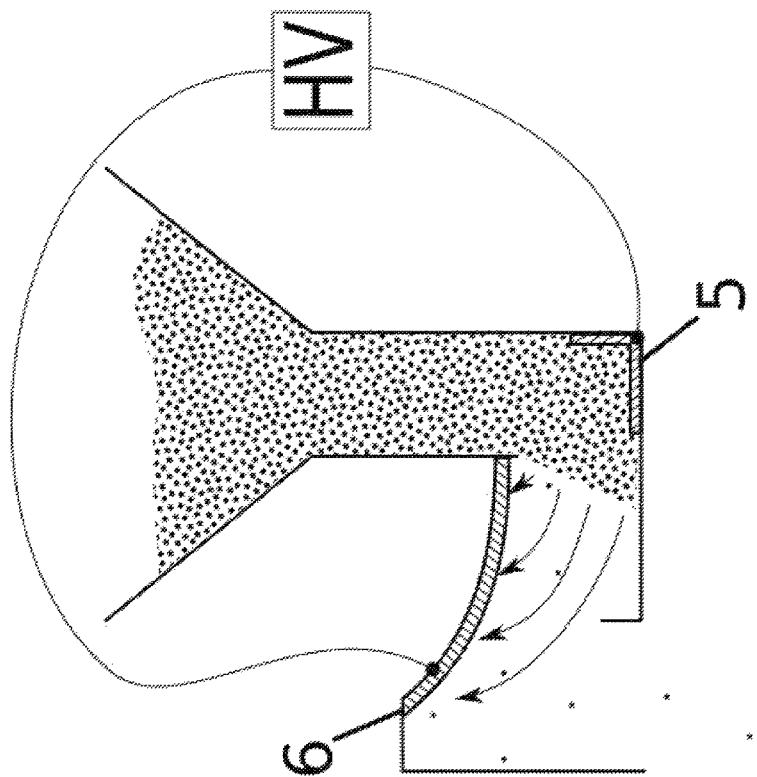
Figure 10C:
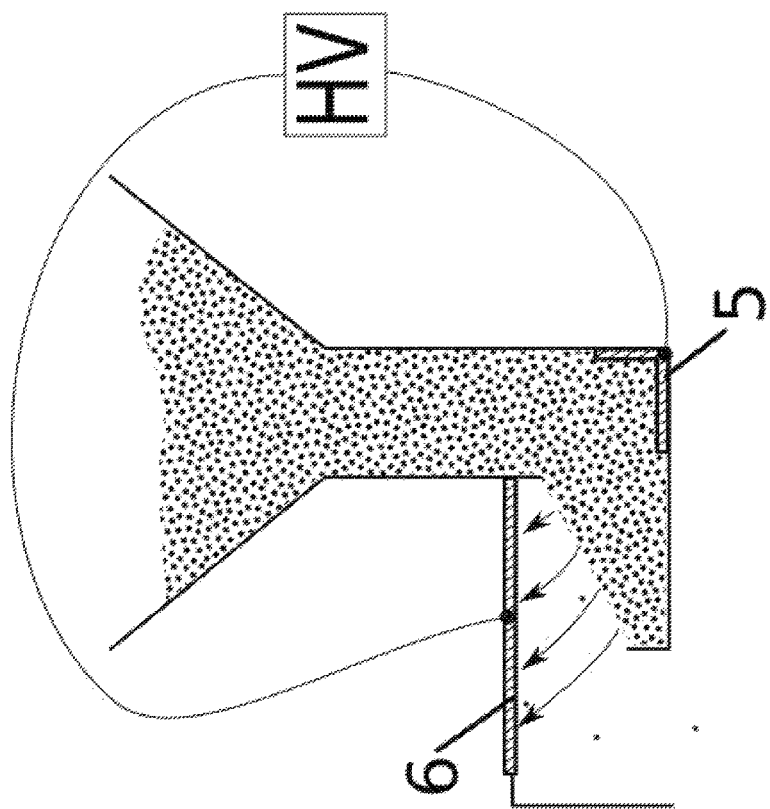
Figure 10D:
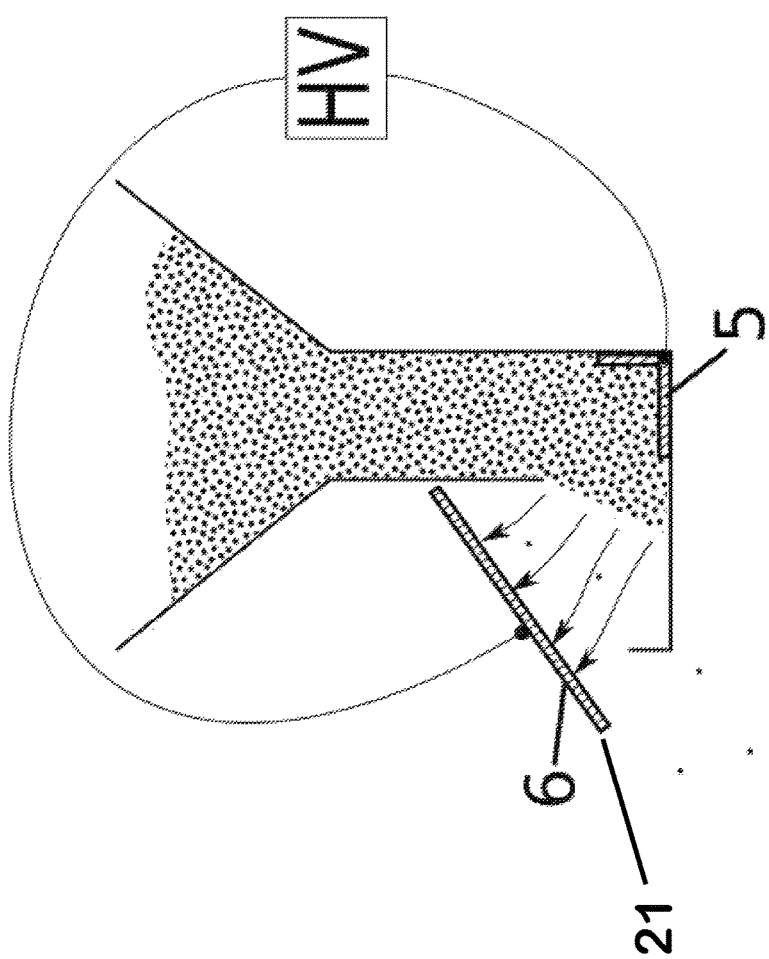
Figure 10E:
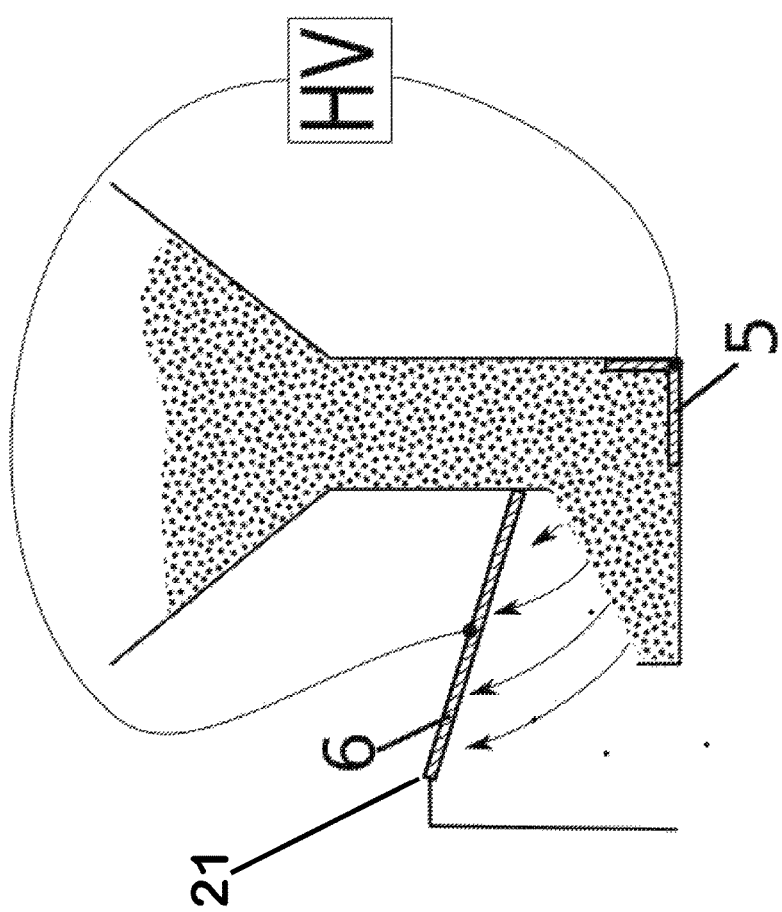
Figure 10F:
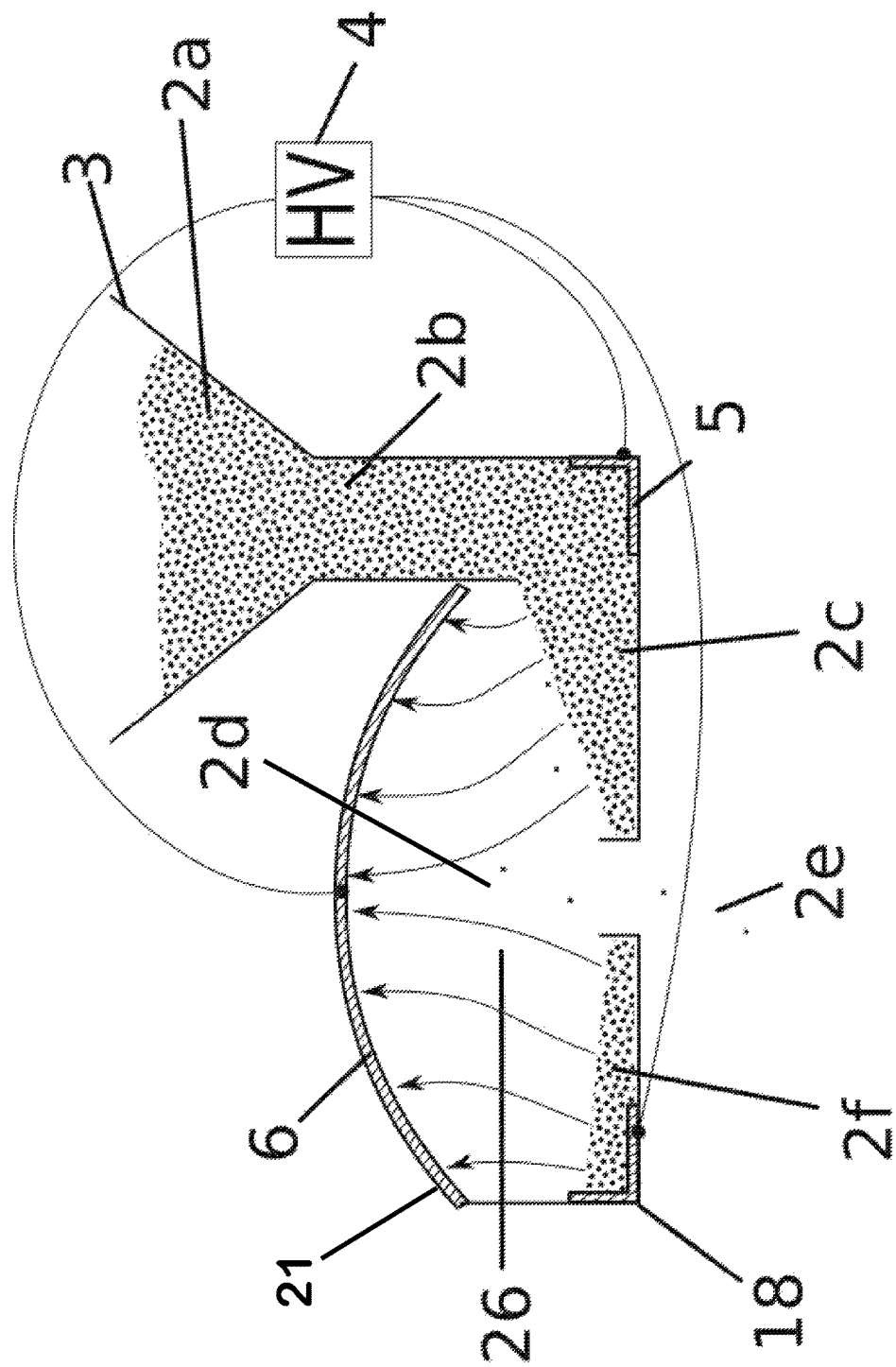
Figure 10G:
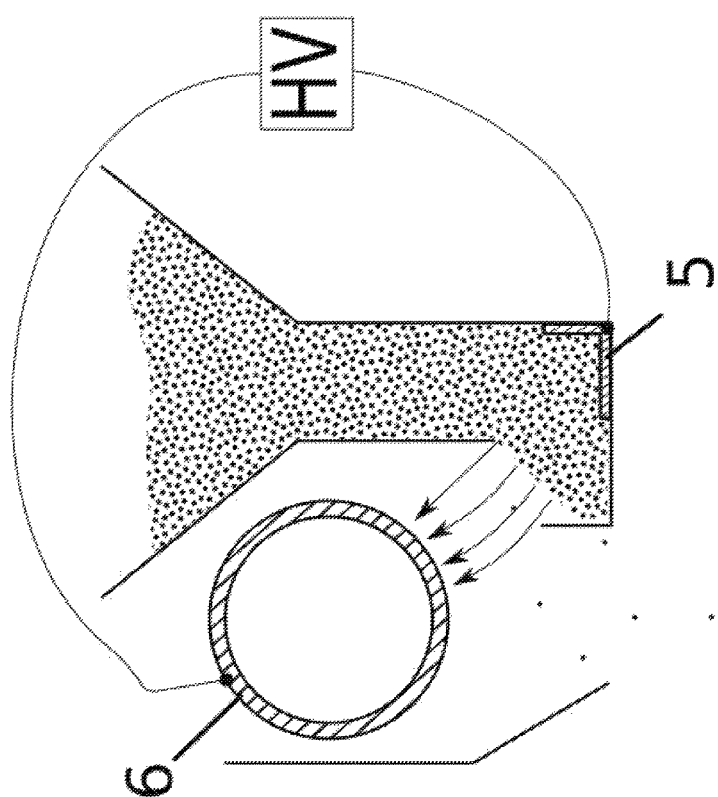

The shape of the electrodes as depicted in the drawings is not meant to be limiting. In this respect, electrodes need not be limited to flat or perpendicular shapes or arranged in parallel or perpendicular arrangement to each other. By way of example, the second electrode can be shaped and positioned such that it is angled (i.e., not parallel or normal) to the first electrode. The second electrode can be convex, concave or a combination of convex and concave curved segments. The second electrode may also be spherical or polygonal. Exemplary alternate shape and arranged second electrodes are shown in FIGS. 10A through 10G. (In FIGS. 9A-10G the arrows within chamber 26 represent field line approximations of electric field experienced by particles 2c when in the space between electrodes 5 and 6.) FIG. 10A depicts a concavely curved second electrode 6 positioned at an angle above and horizontally distant to first electrode 5. FIG. 10B depicts a convexly curved second electrode 6 positioned at an angle above and horizontally distant to first electrode 5. FIG. 10C depicts a straight second electrode 6 that is parallel to, above and completely horizontally offset from first electrode 5. FIG. 10D depicts a straight second electrode 6 that is above and completely horizontally offset from first electrode 5. Additionally, the distal end 21 of second electrode 6 of FIG. 10D is angled toward first electrode 5. FIG. 10E depicts a straight second electrode 6 that is above and completely horizontally offset from first electrode 5. Additionally, the distal end 21 of second electrode 6 of FIG. 10E is angled toward first electrode 5. FIG. 10G depicts a spherical second electrode 6 that is angled to, above and completely horizontally offset from first electrode 5. Though first electrode 5 is shown in the foregoing figures as formed from two perpendicular segments, this depiction is merely exemplary. It too could be formed into various shapes so long as it is configured to be contact with powder particles descending from hopper 3.

Electrodes with complicated shapes can provide enhanced performance over flat electrode configurations by allowing modulation of electric field strength by location. For instance, in locations where the electrodes are closer together, the field strength will be stronger. Additionally, the present invention can be implemented in a feeder that uses more than just two electrodes. One exemplary feeder is shown in FIG. 10F. In FIG. 10F, powder particles 2c landing on first electrode 5 are caused to move into chamber 26 due to the electric field created between first electrode 5 and concave second electrode 6. However, chamber 26 also includes third electrode 18 located below distal end 21 of electrode 6 that charges powder particles 2f falling onto it. Powder particles 2f landing on third electrode 18 are then caused to move into chamber 26 due to the electric field created between second electrode 6 and third electrode 18. Other electrode arrangements are possible. In fact, the invention can be enhanced by making either or both of first and second electrodes 5, 6 (and even third electrode 18) out of an array of individually controllable electrodes.

Basically, the electrode geometry can be manipulated to apply a desired force on a particle depending on where the particle is in the feeder. Similarly, the angles on the upper electrode can be used to reflect particles in different directions too. This would be particularly useful in a stochastic mode feeder. For example, depending upon the particle motion desired one could shape the electrodes to send particles towards the escape aperture of the feeder or direct them back towards the original powder pile to increase the stochasticity of the design.

Not only can the electrodes be arranged in arrays, but any of the above powder feeder designs can be assembled in groups or "arrays." For instance, a group of linear powder feeders could be assembled side-by-side, or in a grid. Because electrostatic feeders are very inexpensive to manufacture, creating an array of hundreds of individual feeders is economically feasible.

An electrostatic powder feeder of the present invention offers many advantages over prior art systems. For example, existing powder feeders often use a load cell to measure powder flow rate monitoring the mass of the entire power feeder. As powder is metered from the powder feeder, the overall mass decreases. However, existing powder feeders involve heavy mechanical parts which produce vibrations that interfere with the accuracy of the load cell's measurements. As a result, the load cell can only measure long-term feed rate trends. Because electrostatic powder feeders are much lighter and involve less mechanical vibration, they allow for increased measurement accuracy using this technique. Also, because current systems rely on mechanical metering of the powder, they often do not perform well at low flow rates (less than 0.1 grams/minute) which are of particular interest for laser metal deposition processes. In contrast, the current system would not rely on mechanical measurement of powder to determine powder flow rates and would not be subject to those issues. Additionally, flow rates would be easier to change as the flow rate would be a factor of changing the electric field and not a product of an inertia-affected mechanical system. Also, the system and method described herein would not be environment dependent. It would work well in an inert gas environment, plain air environment or in a pressurized or vacuum environment. In fact, unlike prior art mechanical systems, a feeder of the present invention could be made air tight as it would have no moving parts. Such application would be especially useful for handling powders that might create hazardous work environments.

Additionally, the present invention system does not have any moving parts (except the powder itself) and therefore the structures of the feeder are less prone to mechanical wear or breakage. Additionally, because the design is mechanically simple, the feeder can be manufactured at a cost lower than motor-driven mechanisms that require complicated machining and assembly. Because it is mechanically simpler, a powder feeder constructed in accordance with the present invention would be smaller and lighter than current motor-driven feeders.

The present invention can also be embodied in various methods. In this respect a preferred embodiment method for electrostatically feeding powder particles would comprise providing a voltage supply in electrical communication with a first electrode and a second electrode, the first electrode and second electrode being spaced apart in a chamber. A hopper is also provided to hold a supply of powder particles. The hopper is configured to drop the powder particles onto the first electrode. The voltage supply is used to produce an electric potential between the first electrode and second electrode. The powder particles are dropped from the hopper onto the first electrode and the potential difference created by the voltage supply is used to cause the powder particles being fed onto the first electrode to develop a surface charge. In an embodiment method applying the direct mode principles, the charged powder particles would move off the first electrode and toward the second electrode with the result that the powder particles being caused to move toward the second electrode subsequently drop away from the second electrode and out of the feeder due to the force of gravity without ever making subsequent contact with the first electrode or the powder pile on it. Preferably, the drop would occur before the powder particles reach the second electrode, but could occur afterwards.

In another preferred embodiment method for electrostatically feeding powder particles the method would comprise providing a voltage supply in electrical communication with a first electrode and a second electrode, the first electrode and second electrode being spaced apart in a chamber. A hopper is also provided to hold a supply of powder particles. The hopper is configured to drop the powder particles onto the first electrode. The voltage supply is used to produce an electric potential between the first electrode and second electrode. The powder particles are dropped from the hopper onto the first electrode and the potential difference created by the voltage supply is used to cause the powder particles being fed onto the first electrode to develop a surface charge. In an embodiment method applying the stochastic mode principles, the charged powder particles would move off the first electrode and toward the second electrode with the result that the powder particles reach the second electrode and then oscillate between the first and second electrodes before exiting the chamber through the escape aperture and dropping out of the feeder.

In the preferred embodiment methods the electrical potential produced between the first electrode and the second electrode is between 1 thousand and 10 thousand volts and the first electrode and the second electrode are preferably spaced five to 10 millimeters apart. Additionally, in the preferred embodiment methods the powder particles are metallic. The methods described herein could use any of the electrode configurations, positioning or shapes described above.

While the present invention has been disclosed in its preferred form, the specific embodiments thereof as disclosed and illustrated herein are not to be considered in a limiting sense, as numerous variations are possible. The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A system for feeding powder particles, the system comprising:
    a hopper adapted to hold a supply of powder particles;
    a voltage supply in electrical communication with a first electrode and a second electrode,
    a chamber including the first electrode and the second electrode;
    the hopper configured to gravity feed the powder particles onto the first electrode;
    the voltage supply being capable of producing an electric potential between the first electrode and the second electrode that creates an electric field within the chamber;
    the electric field created within the chamber causing the powder particles that are fed onto the first electrode to develop an electrical surface charge and be subject to an electrostatic force that causes the powder particles to initially move off of the first electrode and toward the second electrode and then exit the chamber; and
    an ammeter that measures electrical current flowing between the first electrode and the second electrode.

2. A system for feeding powder particles, the system comprising:
    a hopper adapted to hold a supply of powder particles;
    a voltage supply in electrical communication with a first electrode and a second electrode,
    a chamber including the first electrode and the second electrode, the chamber further including an escape aperture;
    the hopper configured to gravity feed the powder particles onto the first electrode;
    the voltage supply being capable of producing an electric potential between the first electrode and the second electrode that creates an electric field within the chamber;
    the electric field created within the chamber causing the powder particles that are fed onto the first electrode to develop an electrical surface charge and be subject to an electrostatic force that causes the powder particles to initially move off of the first electrode and toward the second electrode and then exit the chamber;
    the first and second electrodes being further configured in the chamber such that the powder particles that are caused to initially move off of the first electrode and toward the second electrode reach the second electrode and thereafter oscillate between the first and second electrodes before exiting the chamber through the escape aperture; and
    an ammeter that measures electrical current flowing between the first electrode and the second electrode.

\* \* \* \* \*

UNITED STATES PATENT AND TRADEMARK OFFICE
CERTIFICATE OF CORRECTION

PATENT NO. : 10,035,219 B2
APPLICATION NO. : 14/994973
DATED : July 31, 2018
INVENTOR(S) : Connor Coward Page 1 of 1

It is certified that error appears in the above-identified patent and that said Letters Patent is hereby corrected as shown below:

In Line 17 of Column 3, please add the word "move" after the word "eventually" and before the word "to".

In Line 38 of Column 4, please replace Φο with εο.

Signed and Sealed this
Eighteenth Day of September, 2018

Andrei Iancu
*Director of the United States Patent and Trademark Office*